Patented Apr. 8, 1952

2,592,120

UNITED STATES PATENT OFFICE 2,592,120

PREPARATION OF GLOBULAR PROTEIN SOLUTIONS

John R. Caldwell, Kingsport, Tenn., assignor to Eastman Kodak Company, Rochester, N. Y., a corporation of New Jersey No Drawing. Application February 16, 1949, Serial No. 76,850

5 Claims. (Cl. 106—161)

This invention relates to the preparation of solutions of proteins derived from either animal or vegetable sources by the use of a substantially anhydrous mixture of acetic and phosphoric acids. This invention is particularly directed to the preparation of solutions of globular proteins.

The prior art contains many references to the preparation of protein dispersions and protein solutions in aqueous alkali, such as 2–10% sodium hydroxide, amines, or the like. It is also known that some types of proteins will dissolve in aqueous salt solutions or aqueous urea solutions. However, in all processes employed in the prior art for dissolving proteins, aqueous solvents have been employed. Textbooks and reference books on proteins describe only the use of aqueous alkali or salt solutions as protein solvents.

One object of my invention is to provide solutions or dispersions of proteins which can be used for the manufacture of fibers, sheets, ribbons, or the like. Another object of my invention is to provide a method for dissolving or peptizing proteins without causing excessive degradation of the molecule. A further object of my invention is to provide a protein dispersion that is stable to storage over a relatively long period of time. I have found that these objects may be accomplished by dissolving or peptizing the protein in a substantially anhydrous mixture of acetic and phosphoric acids. I have found that a powerful swelling and peptizing action is asserted upon proteins by substantially anhydrous mixtures containing 60–75% of acetic acid and 40–25% of phosphoric acids. The protein dissolves to give a clear, viscous solution. Usually the swelling and dissolving action is promoted by heating and the protein is converted to a viscous dope by stirring with the acetic-phosphoric acid solvent at 30–60° C. This phenomena is unexpected in view of the lack of satisfactory solvent action of each of these acids individually. Anhydrous acetic acid, for instance, has limited solvent power for proteins. Most proteins are either insoluble in or give gels with acetic acid. Proteins that do show solubility in anhydrous acetic acid generally give cloudy, grainy dopes. The solutions thus formed are unsuitable for use in spinning operations. Phosphoric acid by itself is a good solvent for most of the proteins but the solutions which result therefrom exhibit a high viscosity so that those solutions are not desirable in spinning operations. For instance, 17 parts of soy-bean protein dissolved in 100 parts of phosphoric acid gives a solution which at room temperature is found to be a stiff, opaque gel which will not flow.

The process of the invention is applicable to a wide variety of proteins. The method described herein is especially useful for obtaining solutions or dispersions of the globular proteins, such as represented by soybean protein, peanut protein, cottonseed protein, and hempseed protein. The process, however, is also useful for preparing solutions or dispersions of proteins from other classes as represented by gelatin, casein, and protein from alfalfa stems. The dispersions of proteins as described herein are useful in the manufacture of extruded or coated articles, such as fibers, sheets, tubes, and ribbons. The dispersions also may be used to impregnate cloth or paper.

The novelty of my invention lies in the discovery that proteins can be dispersed in a substantially anhydrous liquid medium. Previously it has only been recognized that aqueous solvents are useful for this purpose. In many cases of aqueous solvents the solutions of proteins therein are unsuitable and undergo rapid changes in viscosity, clarity, etc. The most commonly used solvent for spinning protein fibers is 2–10% aqueous sodium hydroxide. The dispersions or solutions prepared therewith, however, are relatively unstable and must be used within 10–20 hours of mixing. In the presence of free alkali the protein is hydrolyzed and degraded within a short period of time.

I have found that the solutions or dispersions prepared by dissolving proteins in substantially anhydrous acetic acid-phosphoric acid mixtures are stable for periods as long as 10–15 days. Furthermore, little or no chemical change takes place in the protein molecule. There is substantially no tendency toward hydrolysis or degradation. The stability, viscosity, and other properties of the dope depend to a considerable extent upon the nature of the particular protein being used. In some cases mixing the protein with the solvent at room temperature is sufficient to give a clear, smooth dope while in other cases it may be necessary to warm the solvent to 50–60° C. to promote the dissolving.

The solvent which is employed for the proteins consists of 60–75% of substantially anhydrous acetic acid and 40–25% of substantially anhydrous phosphoric acid. By the term "substantially anhydrous" as applied to acetic acid is understood to be acetic acid containing less than 5% of water. Substantially anhydrous phosphoric acid is ordinarily marketed in a form having a strength of at least 85%. The best results are achieved where less than 1% of water is found in either of the acids. The dispersion or solution of the protein in the acetic-phosphoric acid mixture usually contains from 15-50% of protein, in most cases 15-35% protein concentration being most suitable. The proteins used in the process can be those which are obtained by the usual procedures. For instance, proteins from seeds may be extracted therefrom and purified as shown in the prior art. Soybean protein prepared by the method described in Industrial and Engineering Chemistry, vol. 36, page 164 (1944) is suitable for use in the invention. Peanut protein extracted by the process described in Chemical and Engineering News, vol. 24, page 478 (1946) is useful as the material from which protein solution is prepared. Cottonseed protein extracted from cottonseed meal with dilute alkali has been found to be satisfactory. In general, it may be stated that the proteins prepared by methods in which degradation and denaturation is minimized are most useful. Proteins, such as gelatin, egg albumin, casein, and wheat glutin may be of good quality as marketed commercially.

The following examples illustrate my invention:

*Example 1.*—A mixture was prepared of 25 parts of 85% phosphoric acid and 75 parts of glacial acetic acid. 20 parts of casein were added, and the mass was stirred at 20–30° C. for 6–8 hours. A clear, viscous dope was obtained. No change in viscosity or appearance was noted after standing 12–14 days. The dope was coated into an aqueous bath containing 15% of sodium sulfate and 2% of sulfuric acid. A tough film was obtained.

*Example 2.*—Soybean protein of good grade was stirred into a mixture of 3.3 parts of glacial acetic acid and 1.7 parts of phosphoric acid (85%). A clear, viscous dope was produced. The dope was stable for 8–10 days. It was useful for impregnating paper or cloth. Upon extrusion of the dope into an aqueous solution of zinc sulfate and sulfuric acid filaments of good quality were obtained.

*Example 3.*—Two parts of peanut protein of good quality were stirred into a mixture of 7.5 parts of glacial acetic acid and 2.5 parts of anhydrous phosphoric acid. A clear, viscous dope was obtained.

*Example 4.*—Purified egg albumin dissolved in a mixture of 3.5 parts of 85% phosphoric acid and 6.5 parts of glacial acetic acid formed a smooth dope. The dope was capable of extruding into aqueous salt baths to form filaments therefrom.

*Example 5.*—17 parts of soybean protein was dissolved in anhydrous solvent consisting of 30 parts of phosphoric acid and 70 parts of acetic acid. The resulting dope was clear and smooth and was readily flowable at room temperature.

I claim:

1. A protein solution adapted for extrusion into a precipitating bath to form products therefrom which solution consists of 15–50% of a globular protein in a substantially anhydrous solvent consisting of 60–75% acetic acid and 40–25% phosphoric acid.

2. A protein solution adapted for extrusion into a precipitating bath to form products therefrom, which solution consists of 15–35% of a globular protein in a substantially anhydrous solvent consisting of 60–75% acetic acid and 40–25% phosphoric acid.

3. A composition of matter adapted for extrusion into a precipitating bath which composition essentially consists of 15–35% of soybean protein in a substantially anhydrous solvent consisting of 25 parts of phosphoric acid and 75 parts of acetic acid.

4. A composition of matter adapted for extrusion into a precipitating bath which composition essentially consists of 15–35% of peanut protein in a substantially anhydrous solvent consisting of 25 parts of phosphoric acid and 75 parts of acetic acid.

5. A protein solution adapted for extrusion into a precipitating bath to form products therefrom, which solution consists of 15–50% of a globular protein in a substantially anhydrous solvent consisting of 25 parts of phosphoric acid and 75 parts of acetic acid.

JOHN R. CALDWELL.

REFERENCES CITED

The following references are of record in the file of this patent:

UNITED STATES PATENTS

| Number | Name | Date |
|---|---|---|
| 106,911 | Arndt | Aug. 30, 1870 |
| 1,936,753 | Dreyfus | Nov. 28, 1933 |
| 2,115,240 | Sturken | Apr. 25, 1938 |
| 2,403,251 | Watson | July 2, 1946 |

OTHER REFERENCES

"Peptization of Peanut and Cottonseed Proteins," by T. D. Fontaine et al., Ind. and Eng. Chem., vol. 38, No. 6, June 1946.